United States Patent
Li et al.

(10) Patent No.: US 9,071,103 B2
(45) Date of Patent: Jun. 30, 2015

(54) COLOR WHEEL DRIVING MOTOR AND DIGITAL-LIGHT-PROCESSING PROJECTOR

(71) Applicant: NIDEC CORPORATION, Kyoto (JP)

(72) Inventors: Peng Li, Dalian (CN); Dongxu Zhang, Dalian (CN)

(73) Assignee: NIDEC CORPORATION, Kyoto (JP)

( * ) Notice: Subject to any disclaimer, the term of this patent is extended or adjusted under 35 U.S.C. 154(b) by 211 days.

(21) Appl. No.: 13/942,818

(22) Filed: Jul. 16, 2013

(65) Prior Publication Data
US 2014/0063470 A1   Mar. 6, 2014

(51) Int. Cl.
| | | |
|---|---|---|
| G03B 21/14 | (2006.01) |
| H02K 1/27 | (2006.01) |
| G02B 26/00 | (2006.01) |
| H04N 9/31 | (2006.01) |
| H02K 29/08 | (2006.01) |
| H02K 3/52 | (2006.01) |

(52) U.S. Cl.
CPC .............. *H02K 1/272* (2013.01); *G02B 26/008* (2013.01); *H04N 9/3114* (2013.01); *H02K 2203/09* (2013.01); *H02K 3/522* (2013.01); *H02K 29/08* (2013.01); *H02K 1/2786* (2013.01)

(58) Field of Classification Search
CPC .............. G02B 26/008; H04N 9/3114; H02K 2203/09; H02K 3/522
USPC ........ 353/69, 84, 119; 348/743–747, E5.141, 348/E5.143, E9.027
See application file for complete search history.

(56) References Cited

U.S. PATENT DOCUMENTS

| | | | |
|---|---|---|---|
| 7,113,353 B2 * | 9/2006 | Niwa et al. ..................... 359/891 |
| 7,173,780 B2 * | 2/2007 | Hsu et al. ...................... 359/892 |
| 2002/0003704 A1 * | 1/2002 | Ohmae et al. ................. 362/293 |
| 2002/0059038 A1 | 5/2002 | Sekine |
| 2010/0102659 A1 * | 4/2010 | Suzuki et al. ................... 310/71 |

FOREIGN PATENT DOCUMENTS

CN     1179344 C     12/2004

* cited by examiner

*Primary Examiner* — Sultan Chowdhury
(74) *Attorney, Agent, or Firm* — Westerman, Hattori, Daniels & Adrian, LLP

(57) ABSTRACT

A color wheel driving motor includes a magnet arranged radially outward of a rotor holder. The ring-shaped magnet includes n number of N-pole and n number of S-pole and magnetic pole changeover portions arranged between the poles. The magnetic pole changeover portions are arranged at an angular interval of 360°/2n, the n being a positive integer. On an imaginary plane perpendicular to the center axis, a first straight line passing through the center axis and at least one of the 2n magnetic pole changeover portions makes a specified angle θ with respect to a second straight line extending from the center axis toward the ring-shaped magnet. A first mark is arranged in a region of a surface of the ring-shaped magnet where the second straight line overlaps with the ring-shaped magnet, the specified angle θ being equal to or larger than 0° and equal to or smaller than 360°/2n.

20 Claims, 13 Drawing Sheets

COLOR WHEEL DRIVING MOTOR AND DIGITAL-LIGHT-PROCESSING PROJECTOR

BACKGROUND OF THE INVENTION

1. Field of the Invention

The present invention relates to a color wheel driving motor and a DLP projector (digital-light-processing projector) provided with the color wheel driving motor.

2. Description of the Related Art

Conventionally, there are many different kinds of image projection systems. Among them, a DLP (Digital-Light-Processing) (registered trademark) projector has become a dominant stream of digital projectors because it has advantages of high intensity, high durability, small size, and the like. The DLP projector includes a color wheel which is fixed to a color wheel driving motor. When the DLP projector is in operation, it is necessary to detect the rotation position of the motor. In a motor disclosed in, e.g., Chinese Patent No. 1179344, the position of a rotating body is detected by allowing an inductor to detect the magnetic fluxes of a rotor magnet. As shown in FIGS. 1 and 2, the motor includes a rotor yoke 103 formed into a shallow cup shape. The rotor yoke 103 has a flange portion 103a integrally formed with the peripheral portion thereof. A window portion 103b in the form of a cutout having a specified width is formed in a portion of the flange portion 103a. A shaft 109 is attached to the rotor yoke 103 so as to pass through the center of the rotor yoke 103. A rotor magnet 108 having a ring shape and an endless shape is stuck to and arranged on the inner circumference of the flange portion 103a. The rotor magnet 108 is alternately magnetized with S-poles and N-poles at a regular interval along the circumferential direction. A portion of the rotor magnet 108 is passed through the window portion 103b and is exposed outward of the rotor yoke 103. As shown in FIG. 3, an inductor 107 is arranged near the outer circumference of flange portion 103a. For that reason, if the rotor yoke 103 of the motor makes rotation, the rotor magnet 108 facing outward through the window portion 103b is rotationally moved away from or toward the inductor 107. If the rotor magnet 108 exposed from the window portion 103b is moved away from the inductor 107, the inductor 107 seldom receives the magnetic fluxes of the rotor magnet 108. Thus, the induced voltage is equal to nearly zero. However, if the rotor magnet 108 facing the window portion 103b is moved toward the inductor 107, the inductor 107 receives the magnetic fluxes of the rotor magnet 108. The induced voltage of the inductor 107 has a value proportional to the time-dependent variation of the magnetic fluxes. A motor rotation index signal can be obtained by processing a magnetic flux detection output value of the inductor 107.

However, the motor as disclosed in Chinese Patent No. 1179344 suffers from the following technical problems. In the motor, a portion of the rotor magnet 108 is exposed from the window portion 103b. Therefore, an unbalance is generated in the rotor yoke 103. Since the window portion 103b is formed in the rotor yoke 103, the magnetic fluxes of the rotor magnet 108 are leaked through the window portion 103b, thereby worsening the characteristics of the motor. When the rotor magnet 108 is fixed to the rotor yoke 103, an adhesive agent cannot be coated on the entire outer circumferential surface of the rotor magnet 108. This may increase vibrations and noises. When assembling the rotor magnet 108 and the rotor yoke 103, a mark for identifying a border of magnetic poles needs to be attached to the rotor magnet 108, thereby exposing the border of the magnetic poles of the rotor magnet 108 from the window portion 103b. This may reduce the efficiency of an assembling work. In case of employing this method, there is a need to expose the border of the magnetic poles of the rotor magnet 108 from the window portion 103b and to bring the border of the magnetic poles into alignment with a color border of a color wheel.

Accordingly, a need has existed for a motor capable of solving the technical problems noted above.

SUMMARY OF THE INVENTION

In the present invention, for the sake of solving the aforementioned problems, a ring-shaped magnet provided independently of a rotor magnet fixed to the inner circumferential surface of a rotor holder is arranged on the outer circumferential surface of the rotor holder without having to form a window portion in the rotor holder. The ring-shaped magnet has a plurality of magnetic poles arranged along the circumferential direction. A mark for identifying a specific magnetic pole changeover portion is formed in the ring-shaped magnet.

In accordance with an aspect of the present invention, there is provided a color wheel driving motor including: a shaft rotatable about a center axis, and the shaft extending along the center axis; a rotary body including a rotor holder indirectly or directly fixed to the shaft; and a stationary body including a magnetic position detector mechanism arranged near the rotor holder to detect a rotation position of the rotor holder. The motor includes a ring-shaped magnet arranged radially outward of the rotor holder and configured to rotate together with the rotor holder. The ring-shaped magnet includes a first end surface and a second end surface arranged along the center axis in a substantially parallel relationship with each other. The ring-shaped magnet includes n number of N-pole and n number of S-pole alternately arranged along a circumferential direction and magnetic pole changeover portions arranged between the N-pole and the S-pole adjoining each other. The number of the magnetic pole changeover portions is 2n. The magnetic pole changeover portions adjoining each other are arranged at an angular interval of 360°/2n in the circumferential direction. The n is an integer equal to or larger than 1.

On an imaginary plane perpendicular to the center axis, a first straight line passing through the center axis and at least one of the magnetic pole changeover portions makes a specified angle θ with respect to a second straight line extending from the center axis toward the ring-shaped magnet. A first mark is arranged in a region of a surface of the ring-shaped magnet where the second straight line overlaps with the ring-shaped magnet. The specified angle θ is equal to or larger than 0° and equal to or smaller than 360°/2n.

With the motor mentioned above, it is possible to finally decide the positions of the magnetic pole changeover portions in the circumferential direction of the ring-shaped magnet. Since the first mark is arranged in one of the N-pole and the S-pole, if the positional relationship between the first mark and the magnetic pole changeover portions is apparent, it is possible to easily determine the magnetic pole changeover (N→S or S→N) in the rotational direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the subject specification, preferred embodiments of a motor according to the present invention will be described with reference to the drawings which form a part hereof. Throughout the drawings, identical members or structures are designated by like reference symbols. The drawings are not illustrated on a specific reduced scale. The embodiments and the drawings described below are presented merely for the convenience in description. The scope of the present invention is not limited to the below-mentioned embodiments but shall be construed based on the claims.

The terms "upper", "lower", "inner" and "outer" used in the subject specification are defined merely for the purpose of describing the embodiments based on the drawings and are not intended to limit the purport of the present invention. When mounting a motor on an actual device, it is possible for a person skilled in the relevant art to make many different changes or modifications based on the description of the subject specification.

Figure 1:
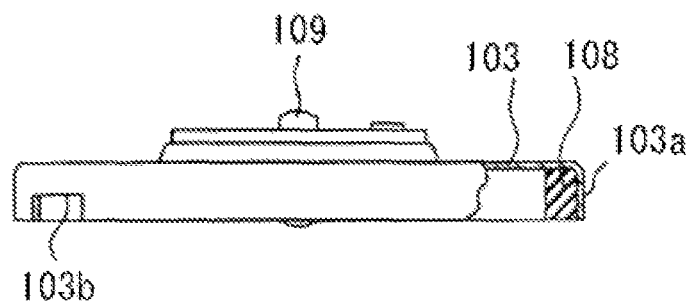
FIG. 1 is a partial section view showing a rotor yoke of a motor disclosed in Chinese Patent No. 1179344.
Figure 2:
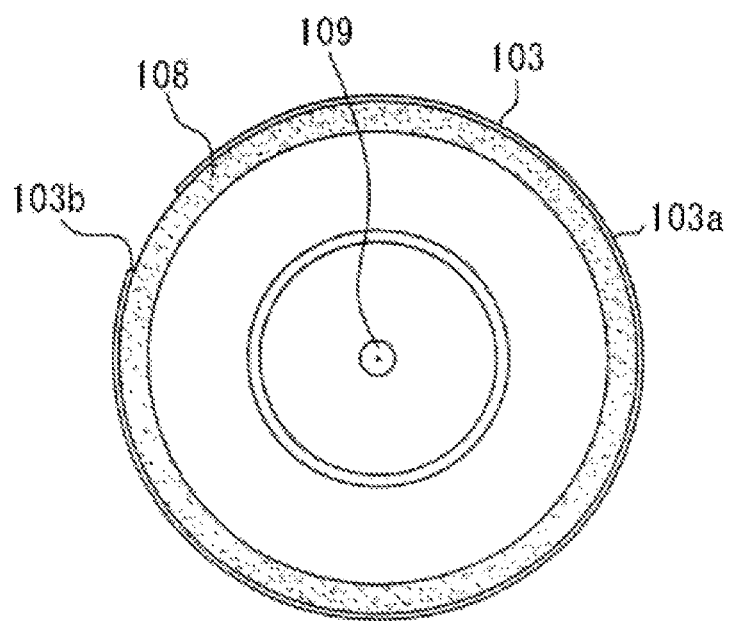
FIG. 2 is a view illustrating the inside of the rotor yoke shown in FIG. 1.
Figure 3:
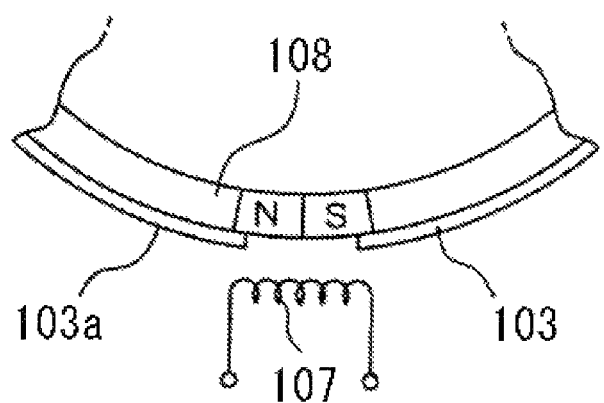
FIG. 3 is a view showing the arrangement position of a coil of an inductor with respect to the rotor yoke of the motor shown in FIG. 1.
Figure 4:
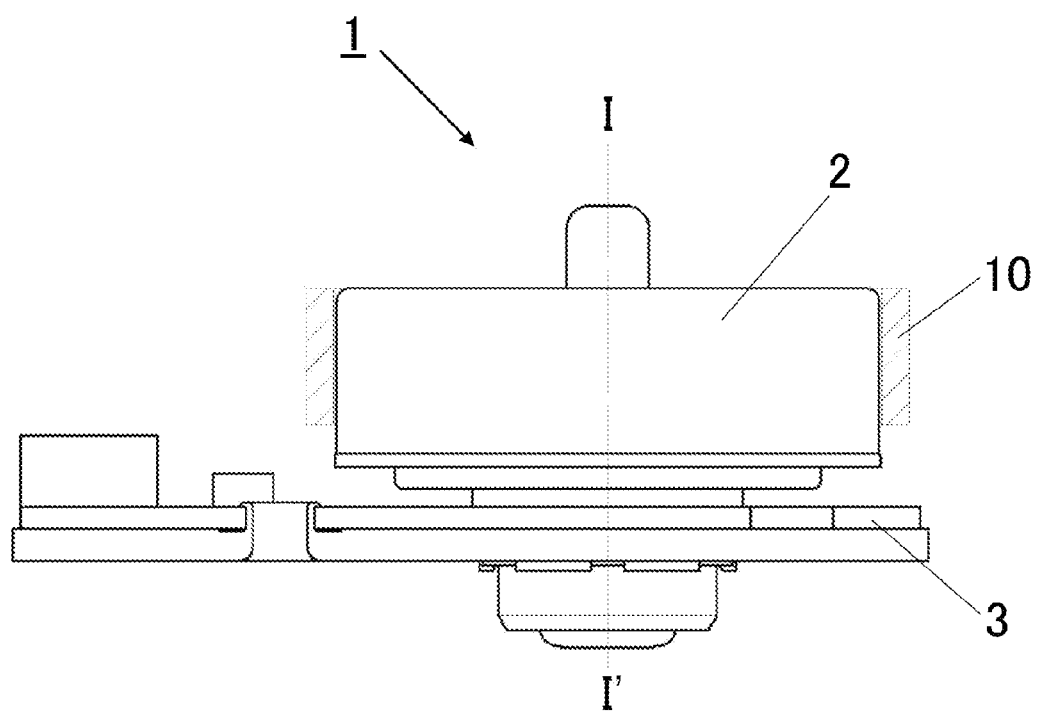
FIG. 4 is a side view showing a motor according to the present invention.
Figure 5:
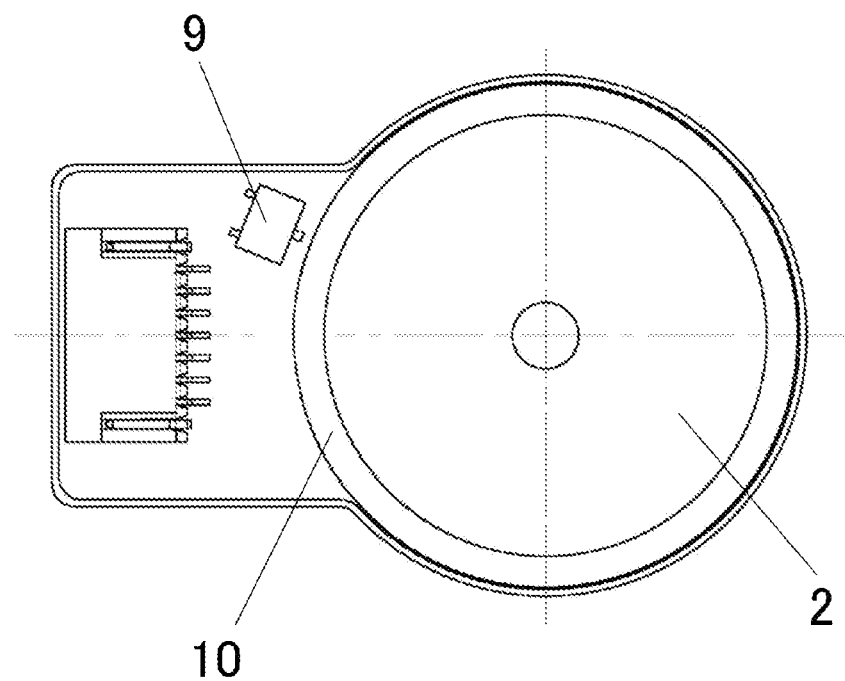
FIG. 5 is a plan view of the motor shown in FIG. 4.
Figure 6:
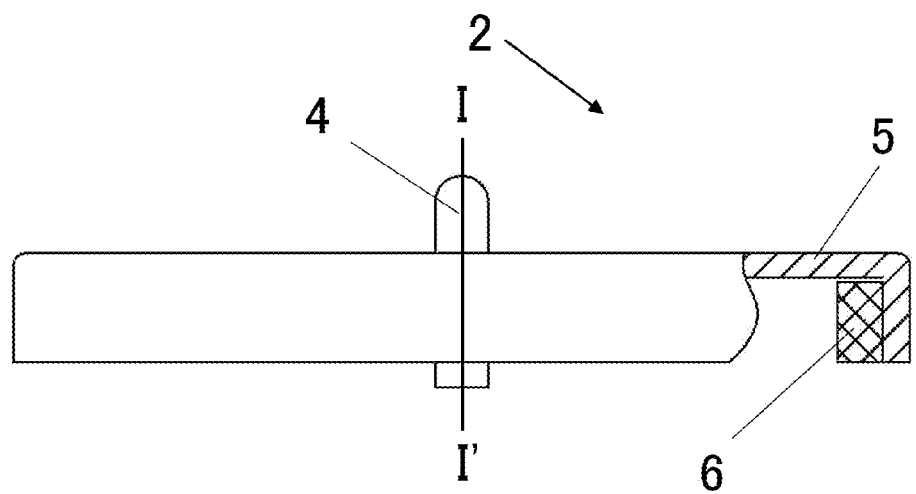
FIG. 6 is a partial section view showing a portion of a rotary body of the motor shown in FIG. 4.
Figure 7:
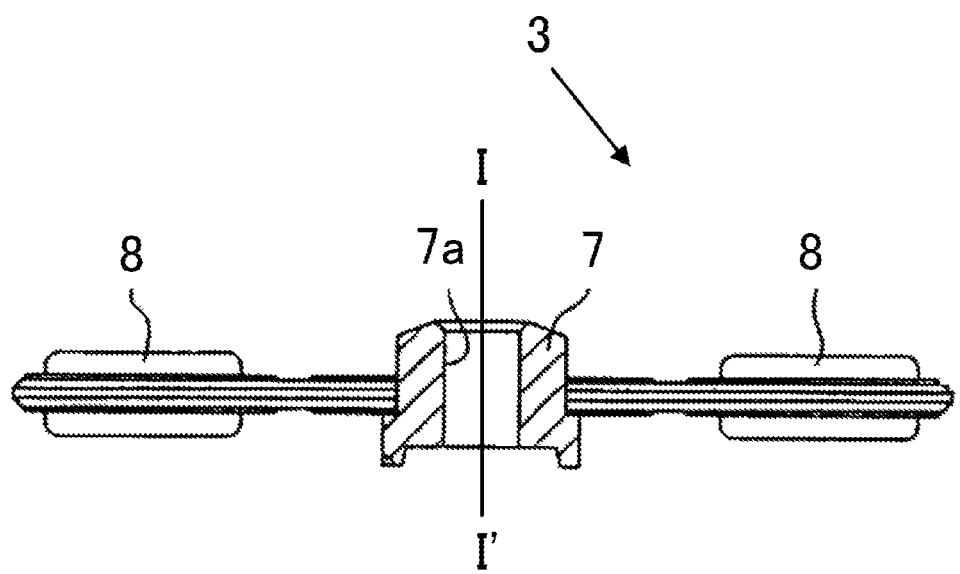
FIG. 7 is a section view showing a stationary body of the motor shown in FIG. 4.

FIG. 4 is a side view showing a motor according to the present invention. FIG. 5 is a plan view of the motor shown in FIG. 4. FIG. 6 is a partial section view showing a portion of a rotary body of the motor shown in FIG. 4. FIG. 7 is a section view showing a stationary body of the motor shown in FIG. 4. The motor 1 according to the present invention preferably includes a rotary body 2 and a stationary body 3. The rotary body 2 rotates about a center axis I-I' extending in the up-down direction. The stationary body 3 is kept stationary with respect to the rotary body 2. As shown in FIG. 6, the rotary body 2 preferably includes a shaft 4, a rotor holder 5 and a rotor magnet 6. The shaft 4 extends along the center axis I-I'. The rotor holder 5 is indirectly or directly fixed to the shaft 4. The rotor holder 5 preferably includes a cylindrical sidewall and a cover portion. The cover portion of the rotor holder 5 extends in a direction substantially perpendicular to the center axis I-I'. The rotor holder 5 has a substantially disc-like shape. The sidewall of the rotor holder 5 extends downward from the outer edge portion of the cover portion. In other words, the rotor holder 5 has a substantially cylindrical closed-top shape. In the present embodiment, the shaft 4 is fixed to the substantially central region of the rotor holder 5. The rotor magnet 6 is fixed to the inner circumferential surface of the sidewall of the rotor holder 5. The rotor magnet 6 has a substantially annular shape. The rotor magnet 6 may be formed of a single member or may be formed by arranging a plurality of arc-shaped magnets along the circumferential direction. As shown in FIG. 7, the stationary body 3 preferably includes a bearing portion 7, a stator 8 and a magnetic position detector mechanism 9 (see FIG. 5). The bearing portion 7 has a shaft hole 7a. The shaft 4 is arranged inside the shaft hole 7a of the bearing portion 7. The bearing portion 7 rotatably supports the shaft 4. The stator 8 is covered with the sidewall and the cover portion of the rotor holder 5. In other words, the stator 8 is positioned radially inward of the rotor magnet 6. The stator 8 is radially opposite to the rotor magnet 6. When the motor 1 is driven, a rotational force is generated between the rotor magnet 6 and the stator 8. The magnetic position detector mechanism 9 is arranged around the rotor holder 5. More specifically, the magnetic position detector mechanism 9 is arranged near a ring-shaped magnet 10 and positioned radially outward of the ring-shaped magnet 10. The ring-shaped magnet 10 will be described later. The magnetic position detector mechanism 9 detects the rotation position of the rotor holder 5. The magnetic position detector mechanism 9 is, e.g., a Hall IC. The aforementioned structure of the motor 1 is well-known to those skilled in the relevant art and will not be described in detail.

In the structure of the motor 1 according to the present invention, no window portion is formed in the sidewall of the rotor holder 5. In other words, the outer circumferential surface of the rotor magnet 6 is not exposed to the outside. In the motor 1, the ring-shaped magnet 10 rotating together with the rotor holder 5 is arranged on the outer circumferential surface of the sidewall of the rotor holder 5. As the magnetic fluxes received from the ring-shaped magnet 10 vary with the rotation of the rotor holder 5, the magnetic position detector mechanism 9 outputs an induced voltage as a function of the position of the ring-shaped magnet 10. At least one N-pole and at least one S-pole are alternately arranged along the circumferential direction of the ring-shaped magnet 10. The present invention is made based on the aforementioned technical concept.

Figure 8:
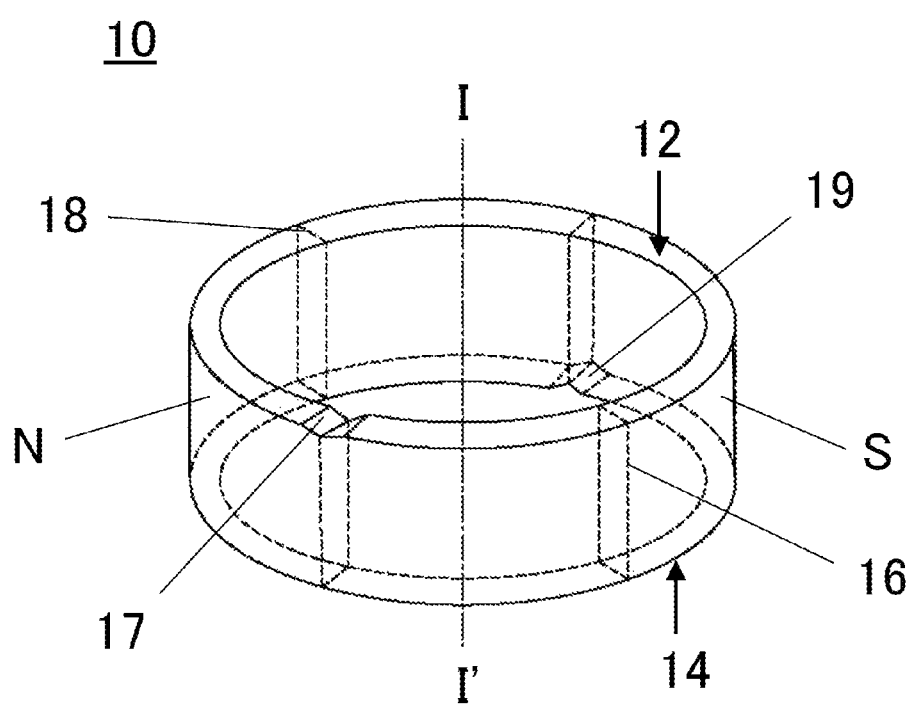
FIG. 8 is a perspective view showing a ring-shaped magnet according to a first preferred embodiment of the present invention.
Figure 9:
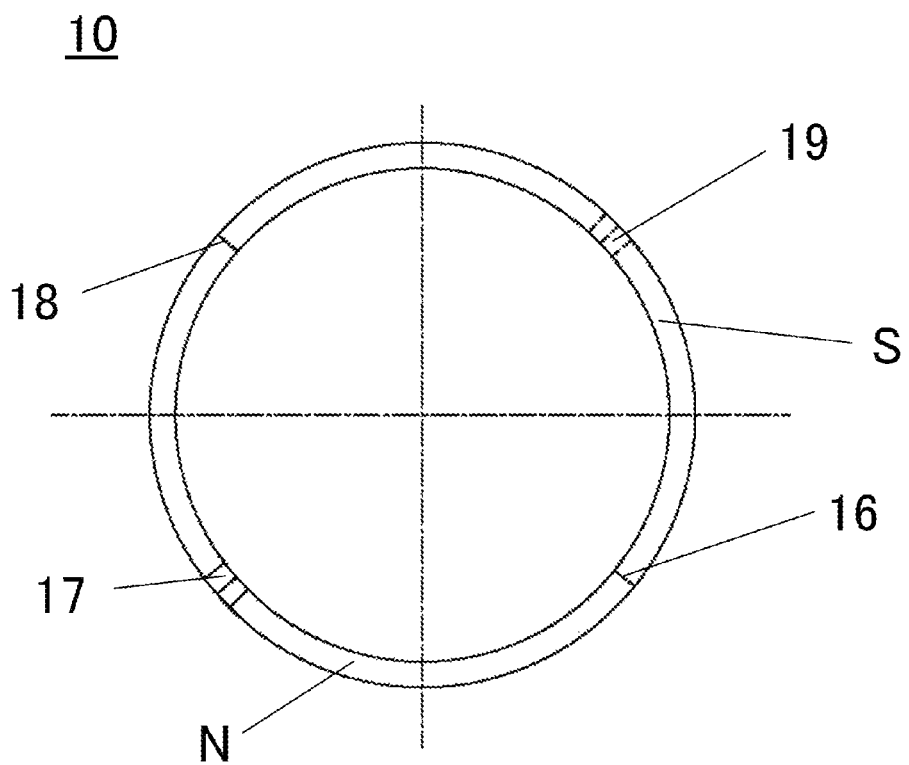
FIG. 9 is a plan view of the ring-shaped magnet shown in FIG. 8.

FIG. 8 is a perspective view showing a ring-shaped magnet according to a first preferred embodiment of the present invention. FIG. 9 is a plan view of the ring-shaped magnet shown in FIG. 8. The ring-shaped magnet 10 is formed into an annular shape about a center axis extending in the up-down direction. The ring-shaped magnet 10 preferably includes a first end surface 12 and a second end surface 14 which are arranged along the center axis. The second end surface 14 is substantially parallel to the first end surface 12. The first end surface 12 and the second end surface 14 are formed into a substantially annular shape about the center axis. When the ring-shaped magnet 10 is attached to the motor 1, the center axis of the ring-shaped magnet 10 is aligned with or substantially aligned with the center axis I-I' of the rotary body 2. As shown in FIGS. 8 and 9, the ring-shaped magnet 10 has a single N-pole and a single S-pole. Two adjoining magnetic pole changeover portions 16 and 18 are formed between the N-pole and the S-pole of the ring-shaped magnet 10. In other words, the magnetic pole changeover portion (N→S) 16 and the magnetic pole changeover portion (S→N) 18 are arranged at an interval of 180° along the circumferential direction. In order to accurately detect the rotation position, it is necessary to identify different magnetic poles and different magnetic pole changeover portions. For that reason, the N-pole (or the S-pole) of the ring-shaped magnet 10 is provided with a first mark 17 arranged at the circumferential center between the adjoining magnetic pole changeover portions 16 and 18. As shown in FIGS. 8 and 9, the first mark 17 is formed in the N-pole. When the ring-shaped magnet 10 is attached to the outer circumferential surface of the rotor holder 5, it is apparent that the magnetic pole having the first mark 17 arranged at the circumferential center thereof is the N-pole. Moreover, the number of the magnetic poles is apparent. It is therefore possible for a worker to easily determine that another magnetic pole is the S-pole. It is also possible for a worker to easily know the magnetic pole changeover portion (N→S) 16 and the magnetic pole changeover portion (S→N) 18. In one preferred embodiment, the first mark 17 is a recess portion depressed from one of the first end surface 12 and the second end surface 14 of the ring-shaped magnet 10 toward the other. The S-pole (or the N-pole) of the ring-shaped magnet 10 is provided with a second mark 19 arranged between the adjoining magnetic pole changeover portions 16 and 18. The second mark 19 is a mark differing from the first mark 17. The second mark 19 may be arranged at the circumferential center of the S-pole (or the N-pole) between the magnetic pole changeover portion (N→S) 16 and the magnetic pole changeover portion (S→N) 18 or may be arranged in other circumferential positions of the S-pole (or the N-pole). In one preferred embodiment, the second mark 19 is a recess portion depressed from one of the first end surface 12 and the second end surface 14 of the ring-shaped magnet 10 toward the other. In one preferred embodiment, the first mark 17 is a recess portion depressed from one of the first end surface 12 and the second end surface 14 of the ring-shaped magnet 10 toward the other. The second mark 19 is a recess portion depressed from one of the first end surface 12 and the second end surface 14 of the ring-shaped magnet 10 toward the other. However, the first mark 17 and the second mark 19 are arranged on different end surfaces. If the first mark 17 and the second mark 19 are arranged on different end surfaces in a manufacturing process, the circumferential position of the ring-shaped magnet 10 with respect to a magnetizing jig can be easily decided in a magnetizing process using the recess portions. Therefore, magnetization can be performed while accurately maintaining the positional relationship between the recess portions and the magnetic pole changeover portions 16 and 18. When the ring-shaped magnet 10 is attached to the motor 1, the ring-shaped magnet 10 can be easily positioned in place by using an attachment jig provided with protrusion portions corresponding to the recess portions. This makes it possible to increase the working efficiency. Needless to say, the first mark 17 may be arranged in the S-pole and the second mark 19 may be arranged in the N-pole.

Figure 10:
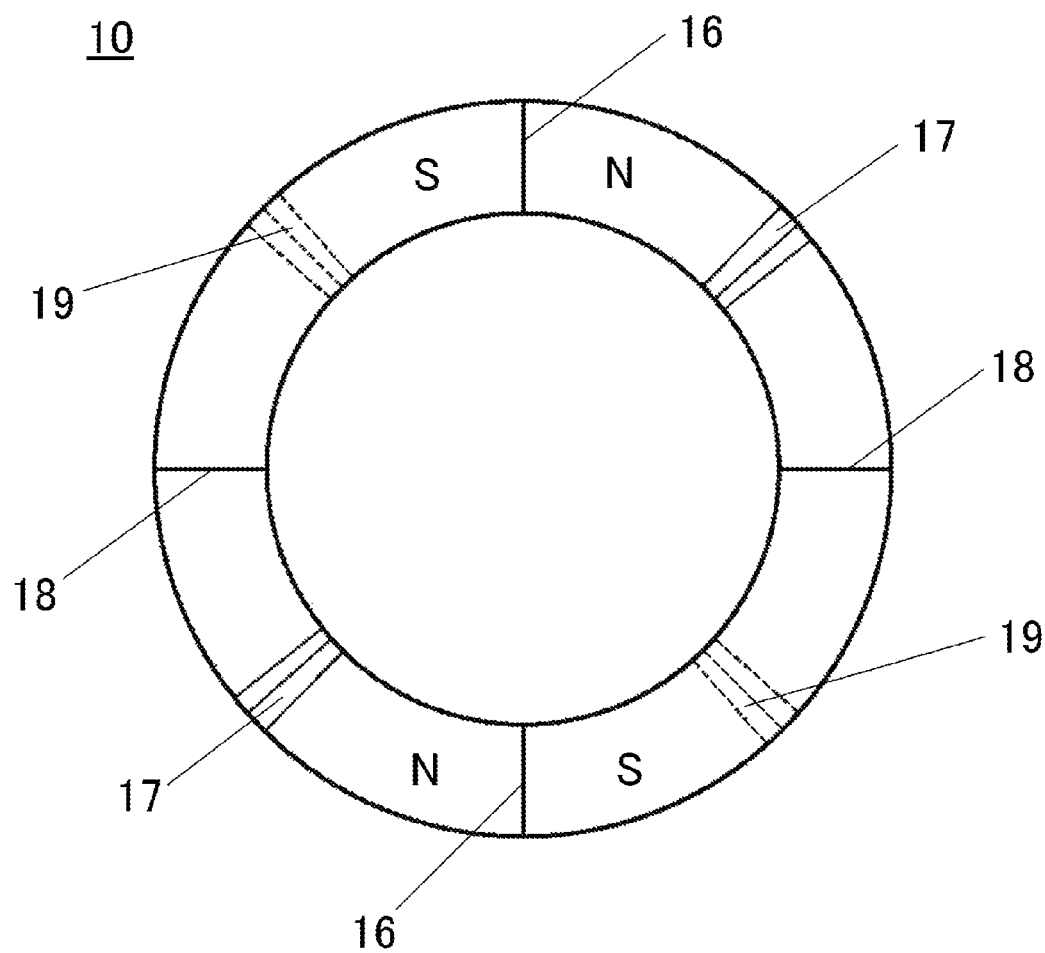
FIG. 10 is a view showing a modified example of the ring-shaped magnet shown in FIGS. 8 and 9.

FIG. 10 is a view showing a modified example of the ring-shaped magnet shown in FIGS. 8 and 9. The ring-shaped magnet 10 preferably includes four magnetic poles (N-poles and S-poles) alternately arranged along the circumferential direction. That is to say, the ring-shaped magnet 10 preferably includes two N-poles, two S-poles and four magnetic pole changeover portions. In other words, the ring-shaped magnet 10 preferably includes two magnetic pole changeover portions (N→S) 16 and two magnetic pole changeover portions (S→N) 18. The adjoining magnetic pole changeover portions 16 and 18 are arranged at an interval of 90°. Each of the N-poles (or the S-poles) of the ring-shaped magnet 10 is provided with a first mark 17 arranged at the circumferential center between the adjoining magnetic pole changeover portions 16 and 18. As shown in FIG. 10, the ring-shaped magnet 10 is provided with two first marks 17 arranged in the N-poles. In one preferred embodiment, the first marks 17 are recess portions depressed from one of the first end surface 12 and the second end surface 14 of the ring-shaped magnet 10 toward the other. Each of the S-poles (or the N-poles) of the ring-shaped magnet 10 is provided with a second mark 19 arranged between the adjoining magnetic pole changeover portions 16 and 18. The first marks 17 and the second marks 19 are marks differing from each other. Each of the second marks 19 may be arranged at the circumferential center of the S-pole (or the N-pole) between the adjoining magnetic pole changeover portions 16 and 18 or may be arranged in other circumferential positions of the S-pole (or the N-pole). In one preferred embodiment, the second marks 19 are recess portions depressed from one of the first end surface 12 and the second end surface 14 of the ring-shaped magnet 10 toward the other. In a most preferred embodiment, the first marks 17 are recess portions depressed from one of the first end surface 12 and the second end surface 14 of the ring-shaped magnet 10 toward the other. The second marks 19 are recess portions depressed from one of the first end surface 12 and the second end surface 14 of the ring-shaped magnet 10 toward the other. However, the first marks 17 and the second marks 19 are arranged on different end surfaces.

Needless to say, the first marks 17 may be arranged in the S-poles and the second marks 19 may be arranged in the N-poles. The ring-shaped magnet 10 includes n number of N-poles and n number of S-poles, which are alternately arranged along the circumferential direction, and 2n number of magnetic pole changeover portions. The adjoining magnetic pole changeover portions are arranged at an interval of 360°/2n where n is an integer equal to or larger than 1.

Figure 11:
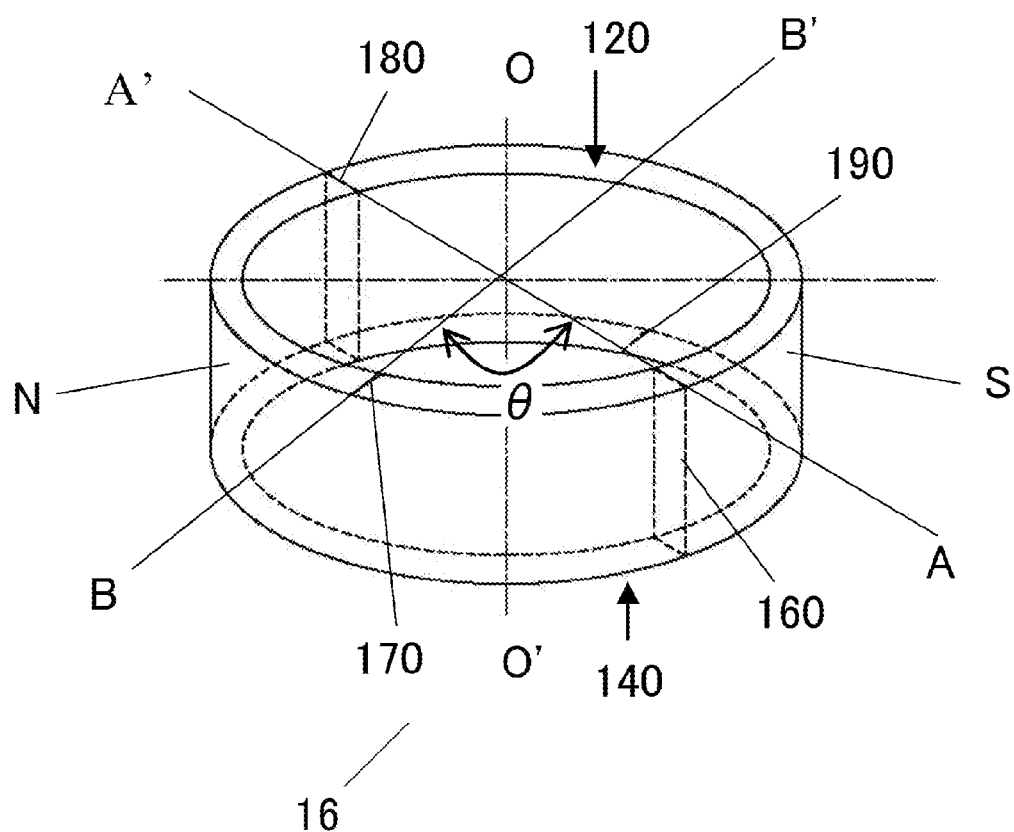
FIG. 11 is a perspective view showing a ring-shaped magnet according to a second preferred embodiment of the present invention.

FIG. 11 is a perspective view showing a ring-shaped magnet according to a second preferred embodiment of the present invention. The ring-shaped magnet 100 is formed into an annular shape about a center axis O-O'. The ring-shaped magnet 100 preferably includes a first end surface 120 and a second end surface 140 which are arranged along the center axis O-O'. The second end surface 140 is substantially parallel to the first end surface 120. The first end surface 120 and the second end surface 140 are formed into a substantially annular shape about the center axis O-O'. As shown in FIG. 11, the ring-shaped magnet 100 preferably includes a single N-pole and a single S-pole. Two adjoining magnetic pole changeover portions 160 and 180 are formed between the N-pole and the S-pole. The magnetic pole changeover portions 160 and 180 are arranged at an interval of 180° (360°/2n where n is equal to 1) along the circumferential direction. On an imaginary plane perpendicular to the center axis O-O' of the ring-shaped magnet 100, a first straight line A-A' passing through the center axis O-O' and the magnetic pole changeover portion 160 makes a specified angle θ with respect to a second straight line B-B' extending from the center axis O-O' to the ring-shaped magnet 100. A first mark 170 is arranged in a region of the surface of the ring-shaped magnet 100 where the second straight line B-B' overlaps with the ring-shaped magnet 100. The specified angle θ is equal to or larger than 0° and equal to or smaller than 180°. As shown in FIG. 11, the interval between the first mark 170 and the magnetic pole changeover portion 160 is equal to the specified angle θ. The interval between the first mark 170 and the magnetic pole changeover portion 180 is equal to 180°−θ.

The ring-shaped magnet 100 preferably further includes a second mark 190. The second mark 190 is arranged in the S-pole at an interval of 180° with respect to the first mark 170 along the circumferential direction. The interval between the first mark 170 and the second mark 190 in the circumferential direction is 360°/2n where n is the number of the N-poles (i.e., the number of the S-poles) and is an integer equal to or larger than 1. The first mark 170 and the second mark 190 are marks differing from each other. Since the first mark 170 is arranged in one of the N-pole and the S-pole, it is possible to easily identify the magnetic pole changeover (N→S or S→N) in the rotational direction.

Figure 12:
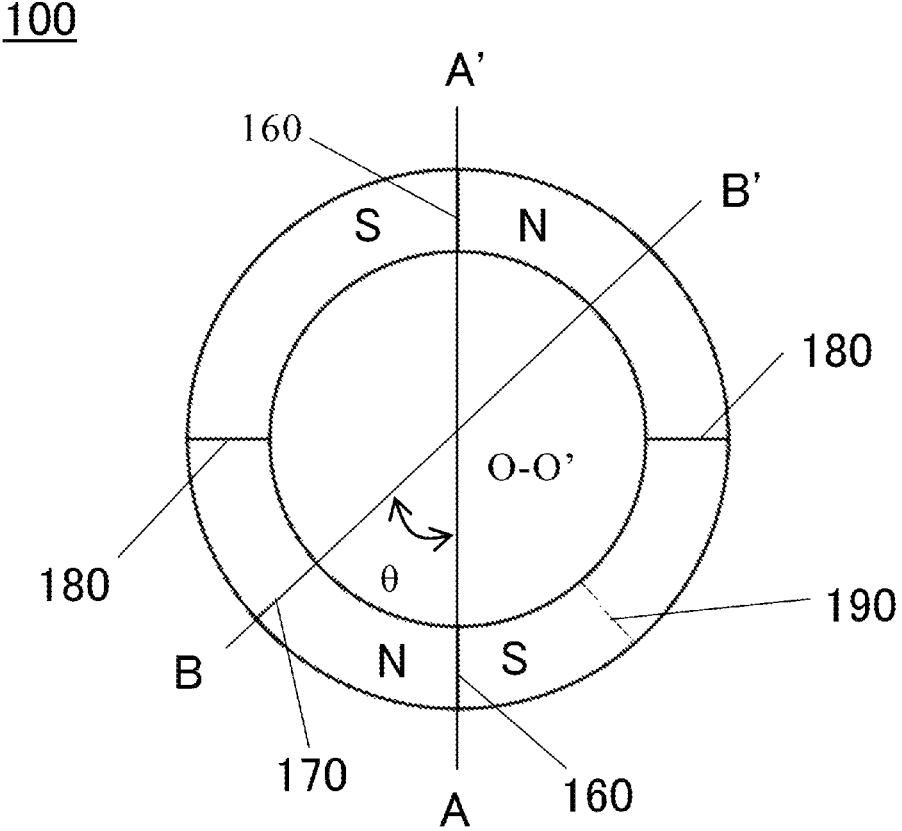
FIG. 12 is a view showing a modified example of the ring-shaped magnet shown in FIG. 11.

FIG. 12 is a view showing a modified example of the ring-shaped magnet shown in FIG. 11. The ring-shaped magnet 100 preferably includes four N-poles and S-poles alternately arranged along the circumferential direction. That is to say, the ring-shaped magnet 100 preferably includes two N-poles, two S-poles and four magnetic pole changeover portions 160 and 180. The interval between the adjoining magnetic pole changeover portions 160 and 180 is 90°. On an imaginary plane perpendicular to the center axis O-O' of the ring-shaped magnet 100, a first straight line A-A' passing through the center axis O-O' and one magnetic pole changeover portion 160 makes a specified angle θ with respect to a second straight line B-B' extending from the center axis O-O' to the ring-shaped magnet 100. A first mark 170 is arranged in a region of the surface of the ring-shaped magnet 100 where the second straight line B-B' overlaps with the ring-shaped magnet 100. The specified angle θ is equal to or larger than 0° and equal to or smaller than 90°. As shown in FIG. 12, the interval between the first mark 170 and the magnetic pole changeover portion 160 is equal to the specified angle θ. The interval between the first mark 170 and the nearest magnetic pole changeover portion 180 is equal to 90°−θ.

The ring-shaped magnet 100 preferably further includes a second mark 190. The second mark 190 is arranged in the S-pole at an interval of 360°/2n with respect to the first mark 170 along the circumferential direction, where n is the number of the N-poles (i.e., the number of the S-poles) and is an integer equal to or larger than 1. In FIG. 12, n is equal to 2. For that reason, the interval between the first mark 170 and the second mark 190 in the circumferential direction is 90°. At this angular interval, the first mark 170 and the second mark 190 are arranged in the N-poles and the S-poles along a specific direction. The first mark 170 and the second mark 190 are marks differing from each other. Since the first mark 170 is arranged in one of the N-pole and the S-pole and the interval between the marks is apparent, it is possible to easily identify the magnetic pole changeover (N→S, or S→N) in the rotational direction.

With the specific preferred embodiment described just above, as shown in FIG. 12, the first straight line A-A' passes through one magnetic pole changeover portion 160 and the second straight line B-B' overlaps with the N-pole of the ring-shaped magnet 100. Alternatively, the first straight line A-A' may pass through one magnetic pole changeover portion 180, or the second straight line B-B' may overlap with the S-pole of the ring-shaped magnet 100. In other words, the first mark 170 may be arranged in the S-pole. The second mark 190 may be arranged in the N-pole. That is to say, the marks may be arranged in different magnetic poles.

The ring-shaped magnet according to the second preferred embodiment of the present invention includes n number of N-poles, n number of S-poles and 2n number of magnetic pole changeover portions. In other words, the ring-shaped magnet includes n N→S magnetic pole changeover portions 160 and n S→N magnetic pole changeover portions 180. The interval between the adjoining magnetic pole changeover portions 160 and 180 is 360°/2n where n is an integer equal to or larger than 1. On an imaginary plane perpendicular to the center axis of the ring-shaped magnet, a first straight line A-A' passing through the center axis O-O' and the magnetic pole changeover portion 160 makes a specified angle θ with respect to a second straight line B-B' extending from the center axis O-O' to the ring-shaped magnet 100. A first mark 170 is arranged in a region of the surface of the ring-shaped magnet 100 where the second straight line B-B' overlaps with the ring-shaped magnet 100. The specified angle θ is equal to or larger than 0° and equal to or smaller than 360°/2n. A second mark 190 is arranged on the surface of the ring-shaped magnet 100. The interval between the second mark 190 and the first mark 170 in the circumferential direction is 360°/2n. The first mark 170 and the second mark 190 are marks differing from each other.

In the first preferred embodiment and the modified example thereof shown in FIGS. 8, 9 and 10, the first mark 17 is positioned at the circumferential center between the adjoining magnetic pole changeover portions 16 and 18. Therefore, it is to be understood that the first preferred embodiment is a special embodiment of the second preferred embodiment. In this case, the interval between the adjoining magnetic pole changeover portions 16 and 18 is 360°/2n. The specified angle θ is equal to 360°/4n. The first mark 17 is positioned at the circumferential center between the adjoining magnetic pole changeover portions.

in one preferred embodiment, the first mark 170 is positioned axially above the axial center of the ring-shaped magnet 100. The second mark 190 is positioned axially below the axial center of the ring-shaped magnet 100. When θ=0° or θ=360°/2n as shown in FIG. 11, the first mark 170 and the second mark 190 have the same circumferential positions as the magnetic pole changeover portions 160 and 180. In one preferred embodiment, the first mark 170 and the second mark 190 are positioned on one of the first end surface 120 and the second end surface 140 of the ring-shaped magnet 100. In a more preferred embodiment, the first mark 170 and the second mark 190 are recess portions depressed from one of the first end surface 120 and the second end surface 140 of the ring-shaped magnet 100 toward the other. In a most preferred embodiment, the first mark 170 is a recess portion depressed from the first end surface 120 of the ring-shaped magnet 100 toward the second end surface 140. The second mark 190 is a recess portion depressed from the second end surface 140 of the ring-shaped magnet 100 toward the first end surface 120. That is to say, the first mark 170 and the second mark 190 are positioned on different end surfaces (as shown in FIG. 13).

Figure 13:
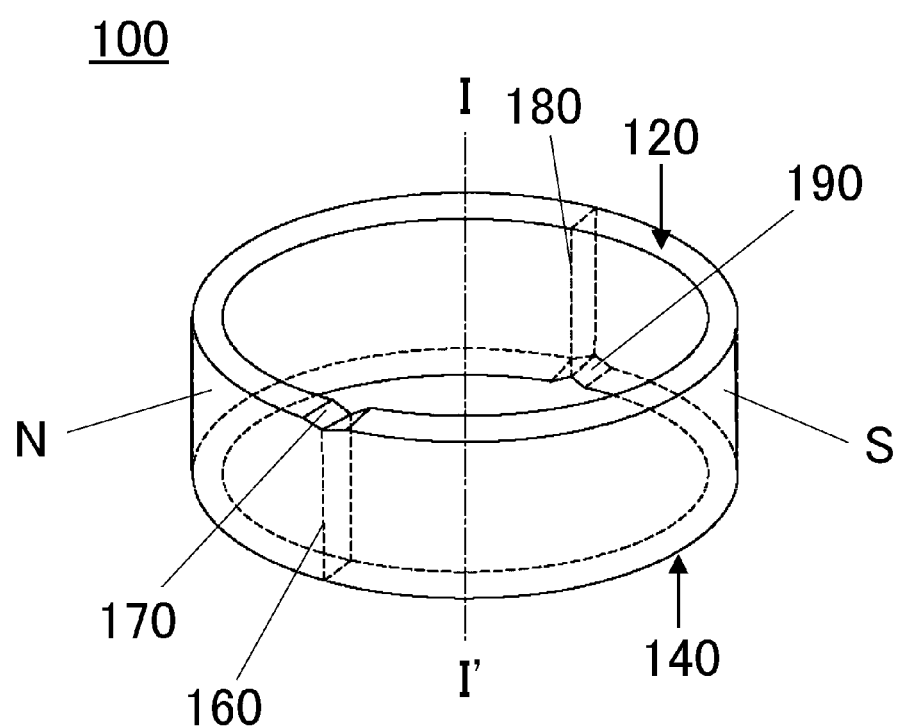
FIG. 13 is a view showing another modified example of the ring-shaped magnet shown in FIG. 11.

If the first mark 170 and the second mark 190 are positioned on different end surfaces and are identical in the circumferential positions with the magnetic pole changeover portions 160 and 180 as shown in FIG. 13, it becomes very easy to attach the ring-shaped magnet 100. In this case, protrusion portions corresponding to the recess portions are formed in an attachment jig, thereby deciding the position of the ring-shaped magnet 100 with respect to the attachment jig. At this time, the relative positional relationship between one of the recess portions and the magnetic poles arranged at the circumferential opposite sides of the recess portion is not changed depending on the vertical attachment directions of the ring-shaped magnet 100. Thus, when attaching the ring-shaped magnet 100, there is no need to pay attention to the attachment directions of the ring-shaped magnet 100. Accordingly, the attachment of the ring-shaped magnet 100 becomes easier.

The first mark 170 and the second mark 190 may be applied on the surface of the ring-shaped magnet by use of a pen or the like. In addition, the first mark 170 and the second mark 190 may be applied on the N-pole and the S-pole in different colors or in different patterns such that they have different colors or different patterns.

The motor according to the present invention is applied to a DLP projector that includes a color wheel having a plurality of colors in a circumferential direction. The color wheel is attached to the aforementioned rotor holder. The color wheel preferably includes a plurality of color regions arranged in the circumferential direction and a plurality of color border portions arranged between the color regions. The first mark or the second mark of the ring-shaped magnet is identical in the circumferential position with each of the color border portions of the color wheel.

The motor according to the present invention need not necessarily have all the features described above. The features may be arbitrarily combined.

The present invention has the following advantages.

The color wheel driving motor according to the present invention includes a rotary body and a stationary body. The rotary body includes a shaft rotating about a center axis and extending along the center axis and a rotor holder directly or indirectly fixed to the shaft. The stationary body includes a magnetic position detector mechanism arranged near the rotor holder so as to detect a rotation position of the rotor holder. The motor includes a ring-shaped magnet arranged radially outward of the rotor holder and rotated together with the rotor holder. The ring-shaped magnet includes a first end surface and a second end surface. The second end surface is opposed to the first end surface. The ring-shaped magnet includes n N-pole, n S-pole and magnetic pole changeover portions arranged between the N-pole and the S-pole. The number of the magnetic pole changeover portions is 2n. The magnetic pole changeover portions adjoining each other are arranged at an angular interval of 360°/2n along a circumferential direction, where n is an integer equal to or larger than 1.

On an imaginary plane perpendicular to the center axis, a first straight line passing through the center axis and at least one of the 2n magnetic pole changeover portions makes a specified angle θ with respect to a second straight line extending from the center axis toward the ring-shaped magnet. A first mark is arranged in a region of the surface of the ring-shaped magnet where the second straight line overlaps with the ring-shaped magnet. The specified angle θ is equal to or larger than 0° and equal to or smaller than 360°/2n. This makes it possible to finally decide the magnetic pole changeover portions in the ring-shaped magnet. Since the first mark is arranged in one of the N-pole and the S-pole, if the positional relationship between the first mark and the magnetic pole changeover portions is apparent, it is possible to easily determine the magnetic pole changeover (N→S or S→N) in the rotational direction.

In one preferred embodiment, a second mark is further arranged on the surface of the ring-shaped magnet. The first mark and the second mark are arranged at an angular interval of 360°/2n along the circumferential direction. The first mark and the second mark differ from each other. Since the positional relationship between the first mark and the second mark is apparent, it is possible to easily identify the positions of the first mark and the second mark. This makes it possible to reduce the time and effort required in attaching the ring-shaped magnet.

In one preferred embodiment, the specified angle θ is equal to 360°/4n. The first mark is arranged at the circumferential center between the adjoining magnetic pole changeover portions in one of the N-pole and the S-pole. Since the first mark is arranged in one of the N-pole and the S-pole, if the positional relationship between the first mark and the magnetic pole changeover portions is apparent, it is possible to easily determine the magnetic pole changeover (N→S or S→N) in the rotational direction.

In one preferred embodiment, the second mark is arranged at the circumferential center between the adjoining magnetic pole changeover portions in the magnetic pole differing from the magnetic pole in which the first mark is arranged. This makes it easy to visually determine the magnetic pole changeover in the rotational direction.

In one preferred embodiment, the first mark 17 is single. This makes it easy to visually determine the magnetic pole changeover in the rotational direction.

In one preferred embodiment, the specified angle θ is equal to 0° or 360°/2n. The first mark is identical in the circumferential position with one of the magnetic pole changeover portions. In the case where a second mark exists, the first mark and the second mark are identical in the circumferential positions with the magnetic pole changeover portions because the specified angle θ is equal to 0° or 360°/2n. This makes it possible to easily determine the magnetic pole changeover positions.

In one preferred embodiment, the first mark is arranged on one of the first end surface and the second end surface of the ring-shaped magnet. This makes it possible to determine the attachment direction of the ring-shaped magnet and to easily fix the ring-shaped magnet to the rotor holder.

In one preferred embodiment, the first mark is a recess portion depressed from one of the first end surface and the second end surface of the ring-shaped magnet toward the other. In the formation process of the ring-shaped magnet, the recess portion can be formed at one time. When attaching the ring-shaped magnet, use is made of an attachment jig having a protrusion portion corresponding to the recess portion. This makes it possible to easily align the position of the ring-shaped magnet with respect to the attachment jig and to increase the working efficiency.

In one preferred embodiment, the first mark is positioned axially above the axial center of the ring-shaped magnet. The second mark is positioned axially below the axial center of the ring-shaped magnet.

In one preferred embodiment, the second mark is a recess portion depressed from one of the first end surface and the second end surface of the ring-shaped magnet toward the other. Therefore, the second mark can be easily formed in the formation process of the ring-shaped magnet. When attaching the ring-shaped magnet, use is made of an attachment jig having a protrusion portion corresponding to the recess portion. This makes it possible to easily decide the position of the ring-shaped magnet with respect to the attachment jig and to increase the working efficiency.

In one preferred embodiment, the first mark is a recess portion depressed from the first end surface of the ring-shaped magnet toward the second end surface. The second mark is a recess portion depressed from the second end surface of the ring-shaped magnet toward the first end surface. Therefore, the recess portion can be easily formed in the formation process of the ring-shaped magnet. When attaching the ring-shaped magnet, use is made of an attachment jig having a protrusion portion corresponding to the recess portion. This makes it possible to easily decide the position of the ring-shaped magnet and to increase the working efficiency. If the specified angle θ is equal to 0° or 360°/2n, the first mark 170 and the second mark 190 are identical in the circumferential positions with the magnetic pole changeover portions 160 and 180. Thus, the attachment direction of the ring-shaped magnet is not restricted to a particular direction. This makes it possible to increase the working efficiency.

In one preferred embodiment, the first mark and the second mark are applied on the surface of the ring-shaped magnet. This makes it possible to easily form the marks.

In one preferred embodiment, the first mark and the second mark are different colors or different patterns formed in the N-pole and the S-pole. This makes it easy to visually determine the magnetic pole changeover portions.

In one preferred embodiment, the color wheel is attached to the rotor holder. The color wheel includes a plurality of color regions arranged in the circumferential direction and a plurality of color border portions arranged between the neighboring color regions. The first mark or the second mark of the ring-shaped magnet is identical in the circumferential position with each of the color border portions of the color wheel. This makes it possible to easily align the magnetic pole changeover portions and the color border portions.

The digital-light-processing projector according to the present invention includes one of the color wheel driving motors described above. The motor of the digital-light-processing projector has high performance and assists in improving the projection performance of the projector.

While certain preferred embodiments of the present invention have been described above, the present invention is not limited to these embodiments. Many different modifications and changes may be made without departing from the scope of the present invention.

What is claimed is:

1. A color wheel driving motor, comprising:
a shaft rotatable about a center axis, and the shaft extending along the center axis;
a rotary body including a rotor holder indirectly or directly fixed to the shaft; and
a stationary body including a magnetic position detector mechanism arranged near the rotor holder to detect a rotation position of the rotor holder,
wherein the motor includes a ring-shaped magnet arranged radially outward of the rotor holder and configured to rotate together with the rotor holder;
the ring-shaped magnet includes a first end surface and a second end surface arranged along the center axis in a substantially parallel relationship with each other;
the ring-shaped magnet includes n number of N-pole and n number of S-pole alternately arranged along a circumferential direction and magnetic pole changeover portions arranged between the N-pole and the S-pole adjoining each other;
the number of the magnetic pole changeover portions is 2n;
the magnetic pole changeover portions adjoining each other are arranged at an angular interval of 360°/2n in the circumferential direction;
the n is an integer equal to or larger than 1;
on an imaginary plane perpendicular to the center axis, a first straight line passing through the center axis and at least one of the magnetic pole changeover portions makes a specified angle θ with respect to a second straight line extending from the center axis toward the ring-shaped magnet, a first mark being arranged in a region of a surface of the ring-shaped magnet where the second straight line overlaps with the ring-shaped magnet; and the specified angle θ is equal to or larger than 0° and equal to or smaller than 360°/2n.

2. The color wheel driving motor of claim 1, wherein a second mark is further arranged on a surface of the ring-shaped magnet, and the second mark and the first mark are arranged at an angular interval of 360.degree./2n in the circumferential direction, the first mark and the second mark differing from each other.

3. The color wheel driving motor of claim 1, wherein the specified angle .theta. is equal to 360.degree./4n, and the first mark is arranged at a circumferential center between the adjoining magnetic pole changeover portions in one of the N-pole and the S-pole.

4. The color wheel driving motor of claim 3, wherein the second mark is arranged at a circumferential center between the adjoining magnetic pole changeover portions in the magnetic pole differing from the magnetic pole in which the first mark is arranged.

5. The color wheel driving motor of claim 4, wherein the first mark is single.

6. The color wheel driving motor of claim 1, wherein the specified angle .theta. is equal to 0.degree. or 360.degree./2n, and the first mark is identical in a circumferential position with one of the magnetic pole changeover portions.

7. The color wheel driving motor of claim 2, wherein the specified angle .theta. is equal to 0.degree. or 360.degree./2n, and the first mark and the second mark are identical in circumferential positions with the magnetic pole changeover portions.

8. The color wheel driving motor of claim 1, wherein the first mark is positioned on one of the first end surface and the second end surface of the ring-shaped magnet.

9. The color wheel driving motor of claim 8, wherein the first mark is a recess portion depressed from one of the first end surface and the second end surface of the ring-shaped magnet toward the other.

10. The color wheel driving motor of claim 2, wherein the first mark is positioned axially above an axial center of the ring-shaped magnet, and the second mark is positioned axially below the axial center of the ring-shaped magnet.

11. The color wheel driving motor of claim 2, wherein the second mark is a recess portion depressed from one of the first end surface and the second end surface of the ring-shaped magnet toward the other.

12. The color wheel driving motor of claim 2, wherein the first mark is a recess portion depressed from the first end surface of the ring-shaped magnet toward the second end surface, and the second mark is a recess portion depressed from the second end surface of the ring-shaped magnet toward the first end surface.

13. The color wheel driving motor of claim 1, wherein the first mark or the second mark is applied on a surface of the ring-shaped magnet.

14. The color wheel driving motor of claim 1, wherein the first mark and the second mark are different colors or patterns respectively formed on the N-pole and the S-pole.

15. The color wheel driving motor of claim 1, wherein a color wheel is attached to the rotor holder, the color wheel including a plurality of color regions arranged in the circumferential direction and a plurality of color border portions arranged between the color regions, the first mark or the second mark of the ring-shaped magnet being identical in a circumferential position with each of the color border portions of the color wheel.

16. A digital-light-processing projector comprising the color wheel driving motor of claim 1.

17. A digital-light-processing projector comprising the color wheel driving motor of claim 5.

18. A digital-light-processing projector comprising the color wheel driving motor of claim 6.

19. A digital-light-processing projector comprising the color wheel driving motor of claim 12.

20. A digital-light-processing projector comprising the color wheel driving motor of claim 15.

\* \* \* \* \*